United States Patent
Gavrila et al.

(10) Patent No.: US 7,157,809 B2
(45) Date of Patent: Jan. 2, 2007

(54) METHOD AND CIRCUITS FOR INDUCTIVE DC CONVERTERS WITH CURRENT REGULATED OUTPUT

(75) Inventors: Gabe C. Gavrila, Colorado Springs, CO (US); Fernando Ramon Martin-Lopez, Colorado Springs, CO (US)

(73) Assignee: Toko, Inc. (JP)

( * ) Notice: Subject to any disclaimer, the term of this patent is extended or adjusted under 35 U.S.C. 154(b) by 418 days.

(21) Appl. No.: 10/243,053

(22) Filed: Sep. 12, 2002

(65) Prior Publication Data

US 2004/0051382 A1    Mar. 18, 2004

(51) Int. Cl.
*H02J 1/00*    (2006.01)
*G05F 1/46*    (2006.01)
*G05F 1/62*    (2006.01)

(52) U.S. Cl. ............................ 307/52; 307/29; 307/43
(58) Field of Classification Search ................. 307/29, 307/43, 52
See application file for complete search history.

(56) References Cited

U.S. PATENT DOCUMENTS

| | | | | |
|---|---|---|---|---|
| 5,734,272 A | * | 3/1998 | Belot et al. | 326/126 |
| 6,130,525 A | * | 10/2000 | Jung et al. | 323/268 |
| 2002/0101224 A1 | * | 8/2002 | Rozsypal | 323/282 |

* cited by examiner

*Primary Examiner*—Brian Sircus
*Assistant Examiner*—Hal I. Kaplan
(74) *Attorney, Agent, or Firm*—William E. Hein

(57) ABSTRACT

A method and circuits for improving the inductive DC converter delivery of regulated current into the load(s), where the inductive DC converter provides the output voltage to an ensemble consisting of the load(s) and a current source or a current source circuit connected in series with the load. The load current is controlled by the current source or the current source circuit in series with the load and not by the inductive DC converter, which only provides the voltage and power required at the output, without directly controlling the load current. The inductive DC converter can operate under much more relaxed specs, while the load current regulation is much tighter, being current source controlled.

6 Claims, 6 Drawing Sheets

METHOD AND CIRCUITS FOR INDUCTIVE DC CONVERTERS WITH CURRENT REGULATED OUTPUT

BACKGROUND OF THE INVENTION

A DC/DC converter is a circuit that receives a continuous DC voltage at the input and efficiently converts it into a continuous DC voltage of a generally different value, at the output. The input voltage can be constant or variable. A DC/DC converter is used when a linear regulator does not offer reasonable efficiency for the application. For instance, if a fresh battery has an initial voltage Uo, that decreases to 0.6Uo, as the battery discharges, the maximum regulated voltage that a linear regulator can provide, is below 0.6Uo. This fact by itself is enough to make a linear regulator unacceptable in numerous applications. Furthermore, when the battery is fresh, its voltage is Uo and the output voltage is below 0.6Uo. This means that almost one-half of the power delivered by the battery is dissipated in the linear regulator, resulting in less than 60% efficiency, which renders a linear regulator unacceptable in numerous applications.

There are many prior art DC/DC converter topologies which, unlike a linear regulator, all involve switching of the DC input voltage. Examples of such converter topologies include step-up or boost converters, whose output voltage is greater than the input voltage, step-down or buck converters, whose output voltage is smaller than the input voltage, boost-buck converters, etc. Many attempts have been made to improve the efficiency, response time, range of operation, etc., for these circuits. Essentially, these circuits receive a voltage input and efficiently convert it to a regulated voltage output.

Unlike DC/DC converters, AC/DC converters receive an alternative voltage at the input and efficiently convert it into a continuous voltage, at the output. There are many possible architectures for AC/DC converters, depending on the application. Generally, a transformer receives an AC primary voltage signal and produces an AC secondary voltage signal, which is then rectified, filtered and regulated to provide a desired output voltage. If the frequency of the input signal does not allow good overall efficiency and/or poses problems from performance, practical device values and/or cost points of view, the input signal can first be rectified and filtered and then followed by a DC/DC converter to produce the desired regulated output. These prior art architectures may be combined in various manners, such as to optimize performance, cost, size, ease of implementation, etc Applications arise in which the performance parameter of interest at the output of the DC/DC converter or AC/DC converter (hereinafter referred to as a DC converter) depends more on the output current than on the output voltage. If the DC converter circuit uses one or more inductors, it is referred to herein as an inductive DC converter. DC converters are essentially voltage sources. In order to control the output current, said output current must be sensed and the corresponding signal fed back to the DC converter, which will adjust the output voltage for a desired value of output current. An example of a load whose performance depends essentially on the load current, instead of the load voltage, is a light emitting diode (LED). Imaging device coils, solenoid actuators, bulbs, etc., are further examples of loads that are current driven. The luminous output of an LED depends, essentially, on the current flowing in the LED. When temperature varies, at constant current, the forward voltage drop across the diode varies. Because of that, a constant voltage applied to the diode would lead to a luminous output which follows the current in the diode and varies with temperature. Instead, a constant current feeding the LED generates a constant luminous output.

As long as the load impedance is linear, a DC converter which uses the load current as its feedback signal can, in principle, effectively regulate the load current. However, if the impedance is either very large or very small, it might become difficult to (a) sense the current and/or (b) to provide reasonable feedback signal levels to the DC converter. If a small voltage variation across the load induces a large current variation in the load, it becomes difficult to regulate the load current using prior art DC converters. Non-linear load impedances present an even more important and more difficult task of load current regulation. All semiconductor diodes, not only LEDs, present a strongly non-linear characteristic of exponential dependency of the current, on the voltage across the diode. That is, a small variation in the voltage across the diode generates a large variation in the current flowing through it. Many other loads, including discrete components and more complex loads, exhibit non-linear characteristics and/or impedance.

However, there is a negative consequence of driving a load directly with a DC converter having a voltage regulated output, when it is desired to regulate the load current. Any DC regulator will exhibit overshoot or undershoot at power up and when the load changes. This is an intrinsic feature of the control loop, which can be minimized to a certain degree, but not eliminated. The voltage overshoot or undershoot at the output of the DC converter is reflected in the load current, thus degrading load current regulation.

Another negative consequence is observed when driving non-linear loads directly with a DC converter. In the case of a diode load, the initial current in the device is practically zero, until the applied voltage reaches the forward voltage drop value for that particular diode. Until this happens, the DC converter senses there is no current in the load, while it tries to regulate that current to a certain non-zero value. So the DC converter ramps up the output voltage hard, but the current is still zero. The process continues, with the DC regulator core reaching maximum output power, until the voltage is high enough to turn on the diode. Actually, at all times, the diode impedance is exponential, but, for all practical purposes, because the corresponding current levels are so small, it appears there is no current flowing into the diode, until the forward voltage reaches a certain value, after which the voltage will remain almost constant for the entire operating current range of the diode. In reality, the voltage across the diode increases a small amount, as the current increases, but the exponential characteristic translates a very large current variation into a very small voltage variation. Hence, the whole practical range of currents in the diode correspond to a very small range of voltages across the diode; that is, the voltage is nearly constant when the diode is on. In this example, when the diode turns on, it is very likely that a large overshoot in load current will occur, because the DC converter feedback loop is operating at maximum output power and it needs time to resume regulation, once there is sensible current flow in the load. Frequency compensation, such as to overdamping the loop response, leads to slower loop response and, consequently, to poorer regulation performance for the DC converter

SUMMARY OF THE INVENTION

It would therefore be advantageous to provide, in accordance with the present invention, an inductive DC converter for regulating the output current instead of regulating the output voltage. One or more current sources are connected in series with the load to function with the inductive DC converter in response to control circuitry.

Separation of the voltage feedback loop of the inductive DC converter from the output current provides superior regulation of the output current. This separation also prevents the translation of the response of the voltage feedback loop to the output current response.

The present DC converter is also advantageous in that separation of the inductive DC converter feedback loop from the output current permits a significant relaxation in the performance requirements for the inductive DC converter, while maintaining the desired output current regulation performance, thus reducing its manufacturing cost. When employing the present inductive DC converter at the same performance level as prior art DC converters, a significant improvement in output current regulation results

DETAILED DESCRIPTION OF THE PREFERRED EMBODIMENTS

Figure 1:
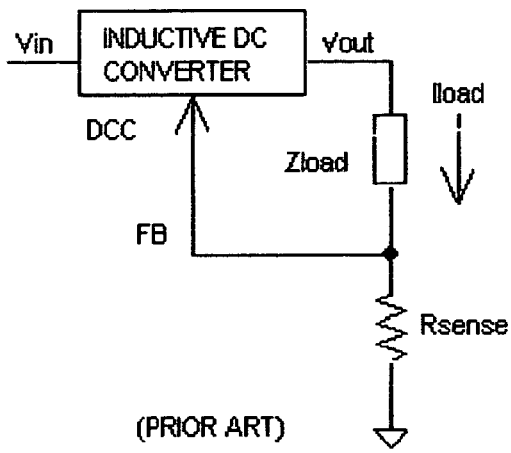
FIG. 1 is a diagram of a prior art circuit employing an inductive DC converter for delivering a controlled output current into a load and in which the load impedance includes a series sense resistor connected to ground.
Figure 2:
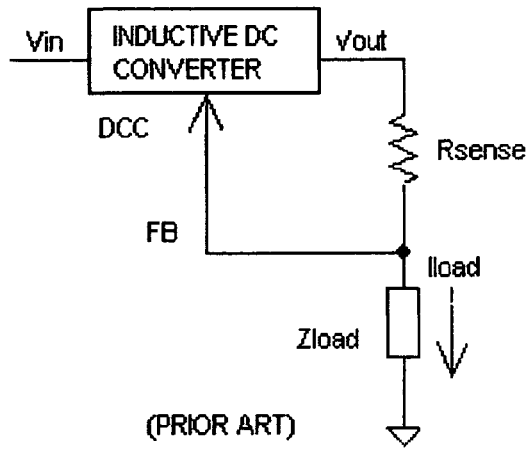
FIG. 2 is a diagram of a prior art circuit similar to that of FIG. 1 in which the series sense resistor is connected high and one end of the load impedance is connected to ground.
Figure 3:
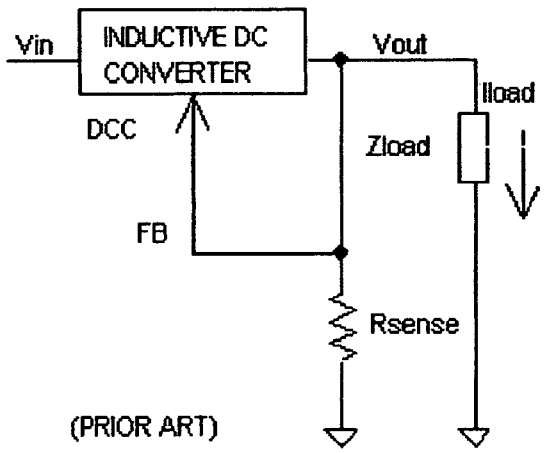
FIG. 3 is a diagram of a prior art circuit similar to those of FIG. 1 and FIG. 2, employing a parallel sense resistor connected to ground.
Figure 4:
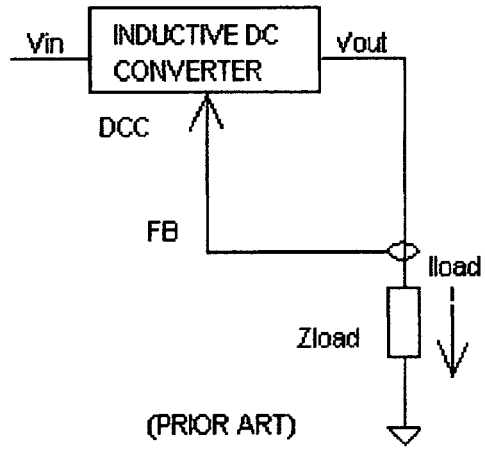
FIG. 4 is a diagram of a prior art circuit similar to those of FIGS. 1–3 in which the output current is sensed without the use of a series element, as in the case of a current probe.

It should be noted that like reference characters refer to the same elements throughout this specification and accompanying drawings.

FIGS. 1–4 show the prior state of the art in delivering a controlled output current into a load, by an inductive DC converter. In any of the cases shown in FIG. 1 through FIG. 4, the output current information, represented by the feedback signal FB, is input to the inductive DC converter DCC. In response to that, the inductive DC converter DCC adjusts the output voltage, such that the output current is regulated to the intended value. The current in the load can be sensed in a variety of ways, a few examples being shown in FIG. 1 through FIG. 4. The most popular method of sensing the current in the load is through a sense resistor Rsense, connected in series with the load.

Figure 5:
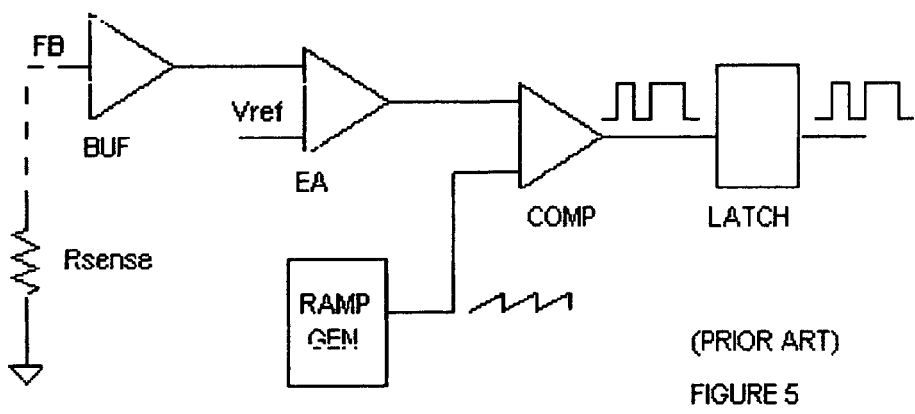
FIG. 5 is a diagram of a prior art circuit representing an inductive DC converter voltage regulation—or feedback—loop, employing pulse width modulation.

An example of a prior art inductive DC converter voltage regulation (feedback) loop is shown in FIG. 5, for the case of a DC/DC PWM (Pulse Width Modulation) converter. This feedback loop utilizes conventional circuit elements BUF, Vref, EA, COMP, LATCR, and RAMP GEN. It can be easily observed that the output current (the current in the load impedance Zload) magnitude information, by means of the feedback signal FB, is input to the inductive DC converter regulation loop and it directly impacts the response of the inductive DC converter voltage loop. It should be mentioned that, even if a measure of the output current level is used as the feedback signal, the loop is called a voltage feedback loop, because the result of its operation is the control of the voltage at the inductive DC converter output. This situation is independent of the particular structure of the inductive DC converter regulation loop, a particular and non-exhaustive example of which is shown in FIG. 5.

The output current, which is the current flowing in the load impedance Zload, is affected by two elements, each with negative impact on output current regulation: the inductive DC converter regulation (voltage) loop response and the voltage-current characteristics (the impedance) of the load Zload. The inductive DC converter regulation loop response introduces overshoot (or undershoot) of the inductive DC converter output voltage, which translates in current variations in the load impedance. While the regulation loop response can be improved, to some degree, it can never be eliminated, in principle. The impedance characteristics of the load dictate how the output voltage variations translate into output current. The load impedance characteristic is not a controllable factor, it depends on the particular load to be driven, in each application. The prior state of the art, as it was explained briefly here, does not allow better regulation of the output current by an inductive DC converter.

The present invention provides a solution to the inherent problems above, regarding the regulation of the load current by an inductive DC converter. The solution proposed in the present invention breaks the direct connection between the output current value and the inductive DC converter regulation loop. The solution proposed in the present invention eliminates the effect of load impedance characteristics, on the value of the output current.

Figure 6:
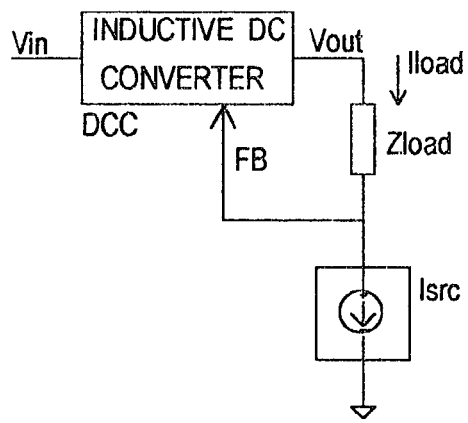
FIG. 6 is a diagram of a circuit in accordance with the present invention that employs an inductive DC converter for delivering a controlled output current into a load and in which a current source Isrc is connected between the load and ground.

FIG. 6 shows an embodiment of the method proposed in the present invention. The load Zload and the current source Isrc are connected in series and powered by the output voltage Vout of the inductive DC converter DCC. The load current Iload is controlled by the current source Isrc. The inductive DC converter DCC has only the role to bias the load and current source ensemble, by providing enough output voltage, Vout, to keep the current source Isrc under proper operating conditions. This is a function that an inductive DC converter does well, as its output is a voltage output. In the present invention, the inductive DC converter does not directly control the level of the load current Iload and the load impedance Zload has no first order effect on the load current Iload. In the prior art, it was the inductive DC converter voltage regulation loop that had the role to regulate the load current Iload. Moreover, in the prior art, a variable or non-linear load impedance Zload had the potential to significantly deteriorate the output current regulation. The solution proposed by the present invention, has the regulation of the load current, Iload, independent of the inductive DC converter output voltage (Vout), independent of the load impedance (Zload) and depending only on the performance and output impedance of the current source in series with the load (Isrc). In the present invention, the load current (Iload) regulation is immune to variations in the inductive DC converter voltage regulation loop response and it is not affected by variations in, or non-linearity of, the load impedance Zload.

According to the present invention, the inductive DC converter role is to regulate the output voltage such as to properly bias the load/current source(s) ensemble, by monitoring the voltage drop across the current source Isrc.

In the prior art, a reference signal (either voltage or current) and a signal sensing the load current are both used in a feedback loop to regulate the inductive DC converter output voltage and, through this, the current in the load. In the prior art, the reference signal controls the load current regulation only through the inter-mediation of the inductive DC converter feedback loop and the load impedance. Both the inductive DC converter feedback loop response and the load impedance characteristics impact the load current regulation. According to the present invention, the voltage drop across the current source Isrc constitutes the feedback signal FB. Different from the prior art, in the present invention, the feedback signal FB does not track the magnitude of the load current Iload, which is the parameter to be regulated. The present invention, different from the prior art, breaks the connection between the inductive DC converter feedback loop and the load current regulation. According to the present invention, the reference signal used by the inductive DC converter feedback loop, be it a voltage or a current reference, does not affect the load current regulation. In the present invention, the feedback signal FB is the voltage across the current source Isrc. The only information about the load current Iload that the feedback signal FB carries, it is to flag the situation when the load current might not be regulated, or it might not flow in the load, if the conditions necessary for proper operation of the current source Isrc are not provided—i.e., if the current source Isrc does not have enough headroom (voltage across itself) to operate properly. The situation can occur just about the same in both prior art and in the solution proposed by the present invention, but the feedback signal FB performs very different roles, in the two cases. In the prior art, the feedback signal FB carries the load current (Iload) level information and it is used to regulate the load current Iload. In the solution proposed by the present invention, the feedback signal FB carries only a binary "function/no function" information about the state of the current source Isrc, while the actual regulation of the load current Iload is left entirely in the charge of the series current source Isrc.

In the present invention, the load current regulation is as good as the reference for the load current regulation is, without any intermediate transfer functions intervening—because the reference for the load current regulation is the current source Isrc itself.

Figure 7:
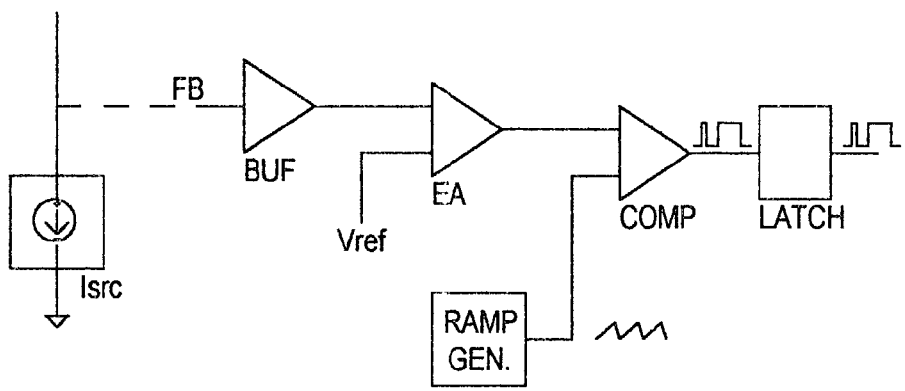
FIG. 7 is a circuit diagram of an inductive DC converter voltage regulation or feedback loop in accordance with the present invention.

FIG. 7 shows the same example of the PWM core circuit shown in FIG. 5, only this time the circuit is applied to the method of the present invention. In the example of the PWM core circuit shown in FIG. 7, the current source Isrc is in series with the load and it is the same current source Isrc of FIG. 6.

The circuit arrangement proposed in the present invention significantly relaxes the performance requirements for the inductive DC converter DCC, with no negative impact on the load current (Iload) regulation. This results into simpler circuitry, easier implementation, cheaper components and, in some cases, smaller size. There are only second order effects of the output voltage (Vout), on the current in the load (Iload), allowing for much tighter regulation of the current in the load (Iload), versus prior art circuits This happens because the impact of the inductive DC converter (DCC) output voltage Vout, on the load current Iload, is limited to the effect that Vout has on the output impedance of the current source Isrc. But the output impedance of the current source Isrc can be made—and, in general, is—much larger than the load impedance Zload. Consequently, the impact of the output voltage (Vout) variation on the load current (Iload) level is significantly reduced in the present invention, versus the prior art, where the output voltage Vout is applied to the load impedance Zload, in order to determine the load current Iload.

It is important to mention that a sense resistor, in series with the load, incurs a voltage drop across itself, when used for feedback purposes (FIG. 1 and FIG. 5). The voltage drop across the sense resistor cannot be made too small, mostly because of noise immunity and other practical considerations. It is usually a fraction of a volt. In addition to basic current sources, which can operate below the one volt levels, there are "wide swing" current source circuit architectures, allowing operation at very low voltage across themselves (small "headroom"), so that the element in series with the load (current source Isrc) does not have a negative impact on the overall efficiency of the inductive DC converter. The current source voltage drop will match, generally, the voltage drop across a series sense resistor.

Figure 8:
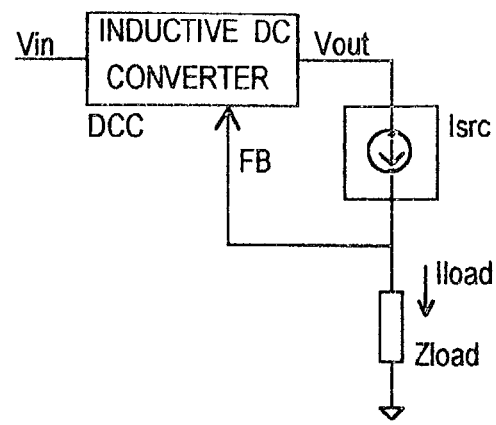
FIG. 8 is a diagram of a circuit in accordance with the present invention that employs an inductive DC converter for delivering a controlled output current into a load and in which a current source Isrc is connected between the output of the inductive DC converter and the load, while the other terminal of the load is connected to ground.
Figure 9:
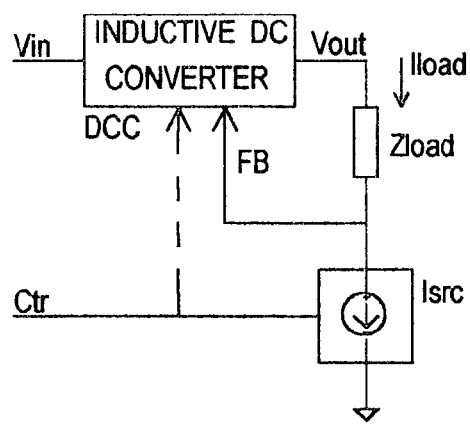
FIG. 9 is a diagram of a circuit in accordance with the present invention that employs an inductive DC converter for delivering a controlled output current into a load and in which a current source Isrc includes a control terminal Ctr that may be employed to control and/or modulate the load current Iload

FIG. 8 shows an embodiment of the present invention, with the current source circuit connected to the inductive DC converter (DCC) output and the load Zload connected between the current source and ground. The same principle described above applies here, with the feedback signal FB monitoring only the voltage drop across the current source Isrc, without tracking the load current (Iload) magnitude. The regulation of the load current Iload is left entirely in the care of the current source Isrc, which, according to the present invention, is the reference for load current regulation. The load current Iload is in regulation as soon as the current source Isrc has enough voltage drop across itself (enough headroom) to operate properly FIG. 9 exemplifies another advantage of the method proposed by the present invention. The prior art controls the current flowing in the load (Iload) through the inductive DC converter output voltage, Vout. To change the load current Iload, the output voltage Vout must be changed, which involves the inductive DC converter voltage regulation loop and, consequently, the loop response gets translated into the load current Iload. The present invention allows load current (Iload) control, without having the inductive DC converter regulation loop response affect the load current (Iload) level. Moreover, prior art requires a supplementary device—a switch—in series with the load, for turning on/off the load current Iload. The present invention allows the use of the Isrc current source itself, for turning on/off the current in the load (Iload) In FIG. 9, the terminal Ctr of the current source Isrc represents this feature: the load current level, Iload, can be controlled by means of the current source Isrc, through its Ctr (from Control) terminal. With proper signal applied to the Ctr pin, the load current Iload can be modulated arbitrarily, independent from the inductive DC converter output (Vout). If the current of the current source Isrc is allowed to become zero at any time during operation and the control signal Ctr is also sent to the inductive DC converter DCC, it allows the latter to ignore the feedback signal FB, when the current source Isrc is disabled. This feature is represented in FIG. 9 by the dotted connection between the control signal Ctr and the inductive DC converter DCC. The usefulness of sending the control signal Ctr to the inductive DC converter DCC for processing, is to be assessed for each specific application. When the current source Isrc is disabled, the feedback node FB is floating, if the inductive DC converter loading of the FB node is negligible, which is, in general, a true assumption. Given this, the inductive DC converter can provide the output voltage Vout that determines the feedback node FB to maintain the same voltage as during normal operation. On the other hand, this might cause the inductive DC converter DCC to shift its output voltage Vout to a level that is different from the value it has during normal operation. Depending on the timing and the particular circuit involved, when normal operation (non-zero current required of the current source Isrc) resumes, it may take longer for the inductive DC converter DCC to settle the output Vout to its normal operation value, after being regulated to some different value, while the current source was disabled, versus settling the inductive DC converter output Vout to its normal operation value, if the output condition was ignored for the time the current source Isrc was disabled. In either case, the method proposed in the present invention has the circuit target directly the correct output state. There is potential for the two cases—ignoring the feedback signal FB during times when the current source is disabled or ignoring the fact that the current source is disabled—to lead to different settling times at the output. This consideration should be balanced against other considerations, related to load requirements, circuit complexity, etc., in deciding to send or not to send the control signal Ctr to the inductive DC converter DCC.

Figure 10:
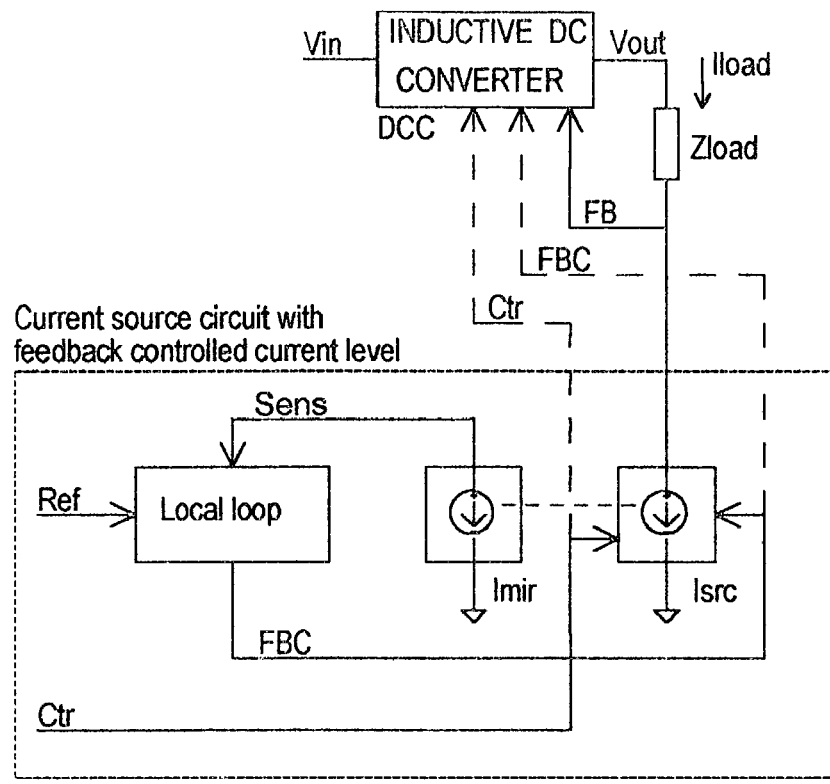
FIG. 10 is a diagram of a circuit in accordance with the present invention that employs an inductive DC converter for delivering a controlled output current into a load and that also employs a current source circuit in series with the load, that allows the output current to be feedback loop controlled, the current source circuit having an optional reference terminal Ref.

FIG. 10 shows an embodiment of the present invention, where the current generated by the current source—therefore, the load current—is directly sensed. While the resulting current sense feedback signal FBC is not sent to the inductive DC converter DCC to control the load current—because the inductive DC converter DCC does not control directly the load current, but the current source Isrc does—the current sense feedback signal FBC may be sent to the inductive DC converter DCC for signaling and/or decision making purposes. This connection is represented by a dotted line in FIG. 10. In FIG. 10, a current mirror arrangement, with the current source Isrc and the current mirror Imir, is shown. The sense signal, designated Sens in FIG. 10, is applied to a local loop for processing, resulting in the current feedback signal FBC. A reference, be it voltage or current, provided to the dedicated local loop, may be used to ensure feedback controlled current level in the current source Isrc. Or the feedback loop might operate without a reference, for instance, to compensate for temperature or voltage variations, etc., in which case sensing the current is not required. This is only a particular and non-exhaustive example of locally regulating the current level in the current source Isrc. It is important to mention that, essentially, the current source can be a simple, basic current source, or it can be a current source circuit, more complex, it may employ current sensing, reference signals, etc. In all cases, all the considerations pertaining to the method and circuits disclosed in the present invention apply, independent of the particular form the current source circuit takes—from basic current source to complex current source circuit. This particular mode in which the current source circuit derives its current level is beyond the scope of the present invention and it affects neither the method, nor any of the circuits disclosed in the present invention. Throughout the present invention, the current sources and the current source circuits appearing in the text and/or drawings can take each other's place, can equally be of arbitrary complexity and design, regardless of the circumstance where they appear and referencing one of the two, references the other one as well (current source for current source circuit and vice-versa). Throughout the present invention, current source and current sink will always imply each other, the term current source being used as in voltage source, current source and not to indicate the direction of the current flow.

It is worth noting an important aspect, regarding the current source Isrc, according to the present invention. The current source in series with the load, Isrc, represents, for the method and circuits covered under the present invention, the reference signal for load current regulation. Different from the prior art, in the present invention, the reference for load current regulation dictates directly the load current, as it is the current source or current source circuit (Isrc) in series with the load (Zload). This consideration was already mentioned above. While the mode in which these reference signals (either voltage or current) are generated, is beyond the scope of the present invention, the circuit example represented in FIG. 10 shows one way, out of many more possible, to generate a reference signal. For the present invention and in FIG. 10, the reference signal needed is the current in the current source (Isrc) in series with the load (Zload). The circuit example shown in FIG. 10 ensures that the current generated by the current source Isrc has the intended value, by means of a reference signal and feedback loop control. The reference signal is designated Ref in FIG. 10. The reference signal Ref of the circuit example shown in FIG. 10 may be absent if, for instance, all the feedback loop does, is compensating for one or more parameters, without controlling the absolute value of the current. Examples for these situations are temperature compensation, voltage supply compensation, etc. Again, there are many ways to generate reference signals, they are beyond the scope of the present invention and the way reference signals are generated, affects neither the method, nor the circuits, disclosed in the present invention.

Another important observation regarding the circuit shown in FIG. 10 can be made now. The current generated by the current source (or, as explained above, the current source circuit) may be controlled and/or modulated by a control signal, designated as Ctr in FIG. 10. If this control signal Ctr results in a wide range of currents to be generated by the current source Isrc (or, as explained above, the current source circuit Isrc), then the voltage drop across the current source, required for its proper operation, may vary with the current level. The inductive DC converter DCC may be set up such as to provide enough voltage Vout at its output, to keep the current source Isrc under proper operating conditions, at all times—that is, even under worst conditions. However, the variation of the voltage drop across the current source Isrc, required for proper operation, lends itself to allowing some gains in efficiency. By monitoring the current generated by (required from) the current source Isrc, the inductive DC converter DCC can adaptively provide the minimum voltage required for proper operation of the current source Isrc, for each value of the current generated by the current source Isrc. This adaptation can be made dynamically, if the current feedback signal FBC is sent to the inductive DC converter DCC or if, under certain circumstances, the control signal Ctr is sent to the inductive DC converter DCC. The control signal Ctr is sufficient to adapt the voltage provided to the current source Isrc for proper operation, if the signal Ctr carries enough information to dynamically determine what the current level is in the current source Isrc. If there are particular conditions, delays due to circuitry, or load, etc., that do not allow it to dynamically (in "real time") track the current in the current source Isrc, then, in order to exploit the situation for increased efficiency, the current in the current source Isrc must be sensed. In each case, the complexity, cost, etc., added by performing these operations, must be weighed against the potential gains in efficiency, gains obtained by operating the current source with the minimum headroom required for proper operation. The current in the load is still controlled by the current source (or, as explained above, the current source circuit) Isrc, which is the reference for load current regulation, while the current sensing only allows the inductive DC converter DCC to improve the overall efficiency. The inductive DC converter DCC does not control directly the load current, which is controlled by the current source Isrc, even when the current generated by the current source is sensed. It is important to notice that current sensing is not necessary for fault condition prevention, as the method described in the present invention self directs itself, with or without load current sensing. Instead, current sensing can help achieve better overall efficiency, if the voltage drop across the current source Isrc is adaptively maintained at the minimum value for proper operation, as the current required of the current source (or, as explained above, the current source circuit) Isrc varies.

Figure 11:
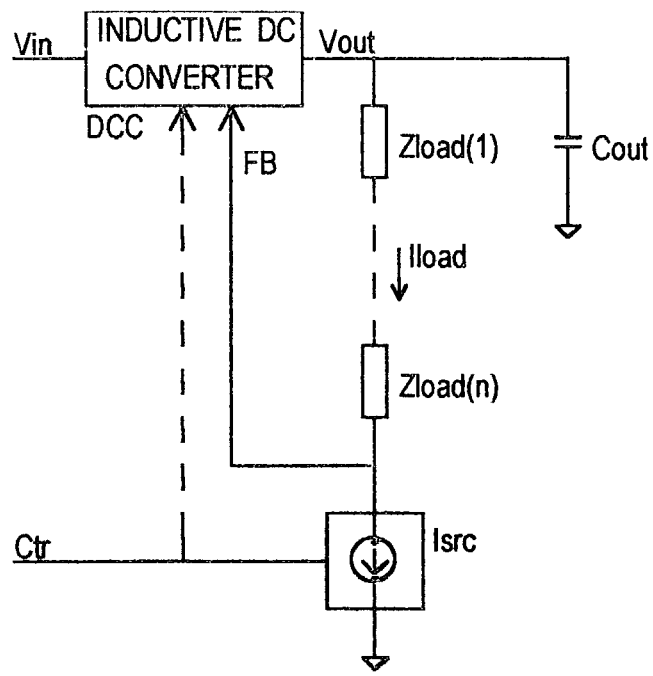
FIG. 11 is a diagram of a circuit in accordance with the present invention that employs an inductive DC converter for delivering a controlled output current into multiple series loads and that also employs an optional control pin Ctr for the current source Isrc and has an optional output capacitor Cout.

FIG. 11 shows an embodiment of the present invention in which individual loads, connected in series, are driven by the inductive DC converter, while the current in the loads is regulated by the current source Isrc. An optional output capacitor Cout is shown. All previous circuits may have one or more optional output capacitors, to reduce output ripple and to smooth out the output voltage Vout. The same considerations made above, regarding the connection between the control signal Ctr and the inductive DC converter DCC, apply here.

Figure 12:
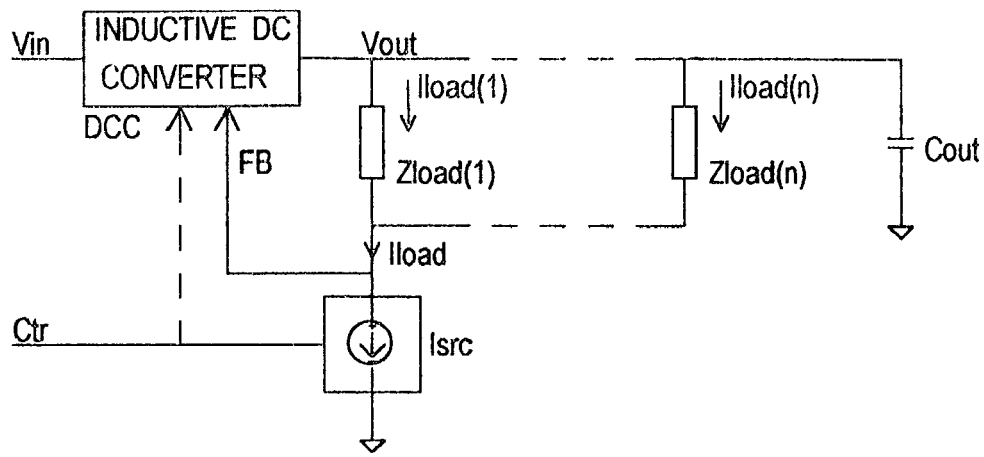
FIG. 12 is a diagram of a circuit in accordance with the present invention that employs an inductive DC converter for delivering a controlled output current into multiple parallel loads and that also employs an optional control pin Ctr for the current source Isrc and has an optional output capacitor Cout.

FIG. 12 shows an embodiment of the present invention, where individual loads, connected in parallel, are driven by the inductive DC converter DCC. The total current (Iload) in the loads Zload(1) through Zload(n), is the sum of the currents in each load, Iload(1) through Iload(n). The circuit shown in FIG. 12 regulates the total load current only, each individual load having a fraction of the total load current Iload, fraction dictated by its impedance and the overall load impedance. The same considerations made previously, regarding the connection between the control signal Ctr and the inductive DC converter DCC, apply here.

Figure 13:
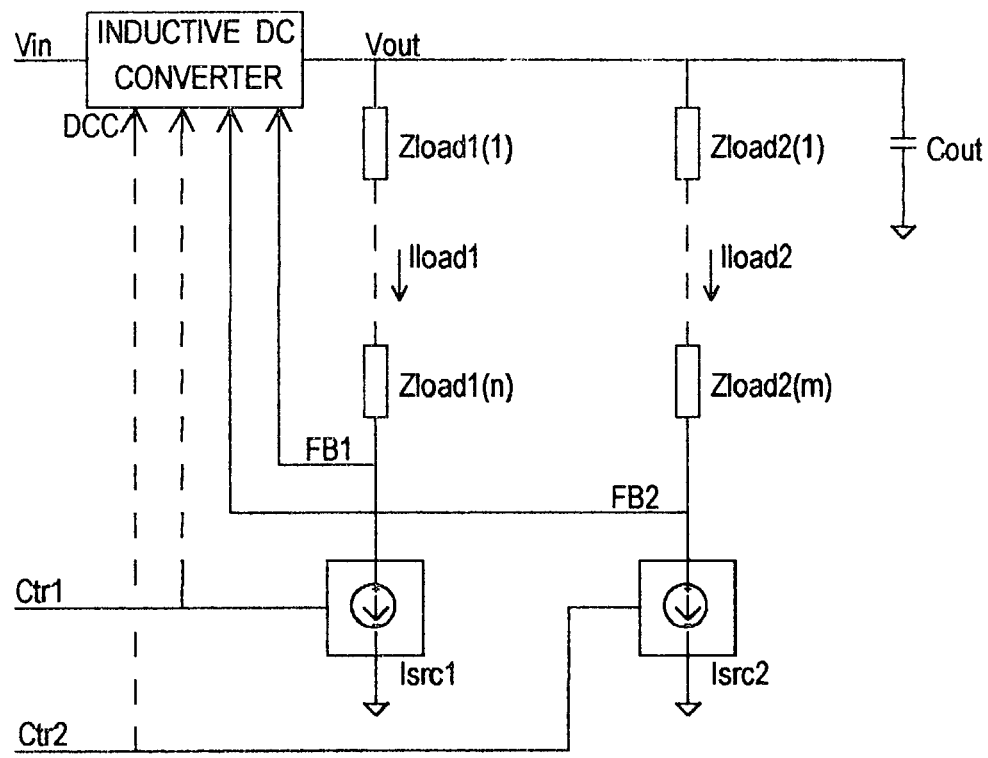
FIG. 13 is a diagram of a circuit in accordance with the present invention that employs an inductive DC converter and current sources Isrc1 and Isrc2 for delivering a controlled output current into two parallel groups of loads, each of which consists of a series of one or more individual loads.

FIG. 13 shows an embodiment of the present invention, where two parallel strings of individual loads connected in series, are driven by the same inductive DC converter DCC. The first string of n individual loads connected in series—Zload1(1) through Zload1(n)—has its current Iload1 controlled by the current source Isrc1. The second string of m individual loads connected in series—Zload2(1) through Zload2(m)—has its current Iload2 controlled by the current source Isrc2. The number of loads, as well as the load current, in one string, are independent from the respective values in the other string. In FIG. 13, the feedback signals from each current source are FB1 and FB2, respectively, and the inductive DC converter DCC must provide enough output voltage (Vout), such as to keep both current sources, Isrc1 and Isrc2, under proper operating conditions (i.e., to provide the voltage drop across the current sources, required for proper operation). If there are no external control terminals for either of the two current sources (terminals designated Ctr1 and Ctr2 in FIG. 13) and if one current source always has more stringent requirements than the other one, then only the corresponding most demanding feedback signal needs to be sent to the inductive DC converter DCC. If it is not known which current source has more stringent requirements or if this may change during operation, both feedback signals must be presented to the inductive DC converter DCC. The output voltage Vout will then be determined by the most demanding of the two current sources—Isrc1 or Isrc2. One more observation: if the control signals Ctr1 and/or Ctr2 include turning off completely the current and not only modulating it to non-zero values, then, for the period of time that the current is zero in a current source, the corresponding feedback signal may be ignored by the inductive DC converter DCC. In FIG. 13, this feature is represented by Ctr1 and Ctr2 dotted connections to the inductive DC converter DCC. The same considerations made previously, regarding the connection between the control signal Ctr and the inductive DC converter DCC, apply here.

Figure 14:
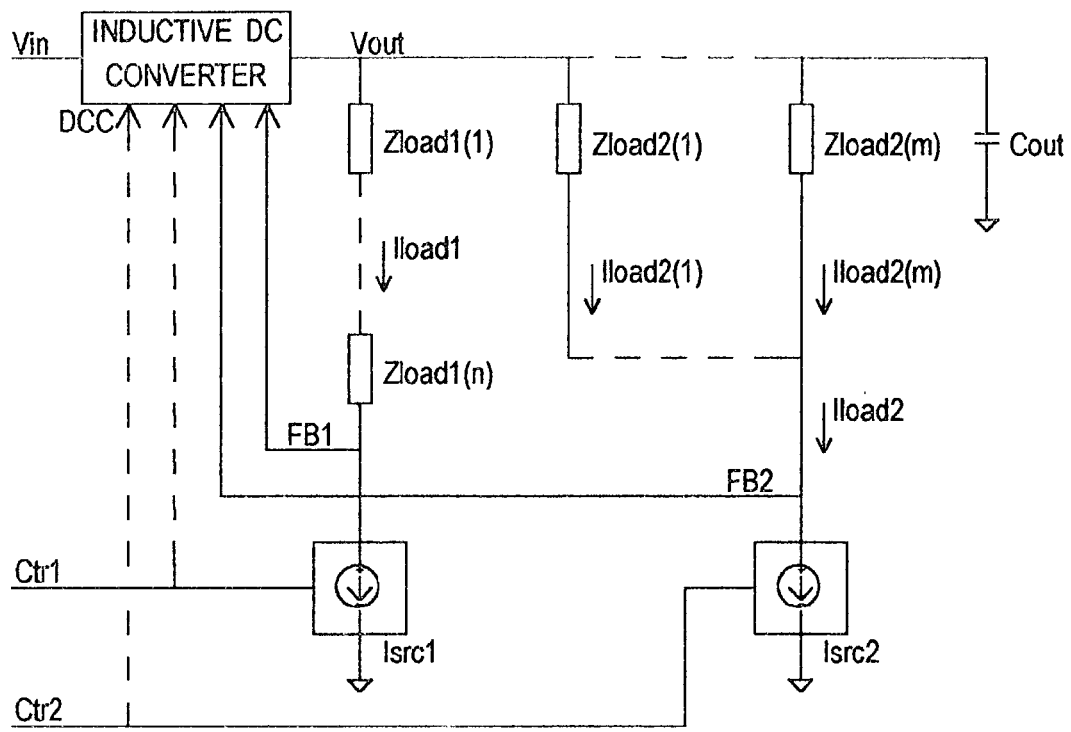
FIG. 14 is a diagram of a circuit in accordance with the present invention that employs an inductive DC converter and current sources Isrc1 and Isrc2 for delivering a controlled output current into two parallel groups of loads, one of which consists of one or more individual loads connected in series and the other of which consists of one or more individual loads connected in parallel.

The method disclosed in the present invention requires the inductive DC converter DCC to output a high enough voltage to keep all current sources under proper operating conditions. If one of the current sources is disabled (current zero) and the other one is not, the voltage across the disabled current source is arbitrary, so any condition is a proper operating condition for it. Therefore, that situation (one of the current sources disabled) should not impact the efficiency of a circuit which operates according to the method disclosed in the present invention. In general, the voltage drop across the load branch containing the active source is the voltage drop across the current source plus the voltage drop across the load, while the branch with the series current source disabled requires only the voltage drop across the current source, but receives more. Because no current flows in the branch with the disabled current source, there is no potential loss of efficiency, even if the voltage across the current source is greater than the minimum necessary for proper operation (which is zero, in the case of a disabled current source). The possibility of efficiency loss in this situation occurs only if the disabled current source or current source circuit requires, when enabled, a proper operation voltage drop that is greater than the sum of the proper operation voltage drop for the other current source, plus the voltage drop across the load of the active branch. If this happens, the voltage drop across the active branch is greater than it needs to be, because the inductive DC converter DCC will still provide enough voltage to keep both current sources under proper operating conditions. The load is powered correctly, but there is an efficiency loss. To prevent this situation from occurring, the corresponding Ctr signal for the disabled current source must be sent to the inductive DC converter DCC, in order to ignore the feedback signal FB of the disabled current source. The method disclosed in the present invention provides fail-proof operation and, in the unusual case mentioned here, while the load is correctly powered at all times, the efficiency may be improved by having the control signal Ctr from the current source which can be disabled during operation, sent to the inductive DC converter DCC FIG. 14 shows an embodiment of the present invention where two parallel groups of loads are driven by the inductive DC converter DCC. The n individual loads of the first group, Zload1(1) through Zload1(n), are connected in series. The current in this branch, Iload1, is controlled by the current source Isrc1. The current source Isrc1 has an optional control terminal, Ctr1, allowing the control and/or modulation of its current. If the control pin Ctr1 allows turning off the current put out by the current source Isrc1, then the control signal Ctr1 may be also sent to the inductive DC converter DCC, in order to have the inductive DC converter DCC ignore the operating condition of the current source Isrc1, when the latter is disabled. The operating condition is extracted from the feedback signal FB1. This feature is represented by the dotted connection between the signal Ctr1 and the inductive DC converter DCC. The considerations made previously, about the connection between the control signal Ctr and the inductive DC converter DCC, also apply here. The m individual loads of the second group of loads, Zload2(1) through Zload2(m), are connected in parallel and are passed by the load currents Iload2(1) through Iload2(m), respectively. The sum of the currents flowing in said second group of loads is Iload2, and that is controlled by the current source Isrc2. Currents Iload2(1) through Iload2(m) are determined by the ratio of each individual load impedance versus the impedance of their parallel connection and by the current Iload2. The current source Isrc2 has an optional control terminal, Ctr2, allowing the control and/or modulation of its current If the control pin Ctr2 allows turning off the current put out by the current source Isrc2, then the control signal Ctr2 may be also sent to the inductive DC converter DCC, in order to have the inductive DC converter DCC ignore the operating condition of the current source Isrc2, when the latter is disabled. The operating condition is extracted from the feedback signal FB2. This feature is represented by the dotted connection between the signal Ctr2 and the inductive DC converter DCC. The considerations made previously, about the connection between the control signal Ctr and the inductive DC converter DCC, also apply here.

Figure 15:
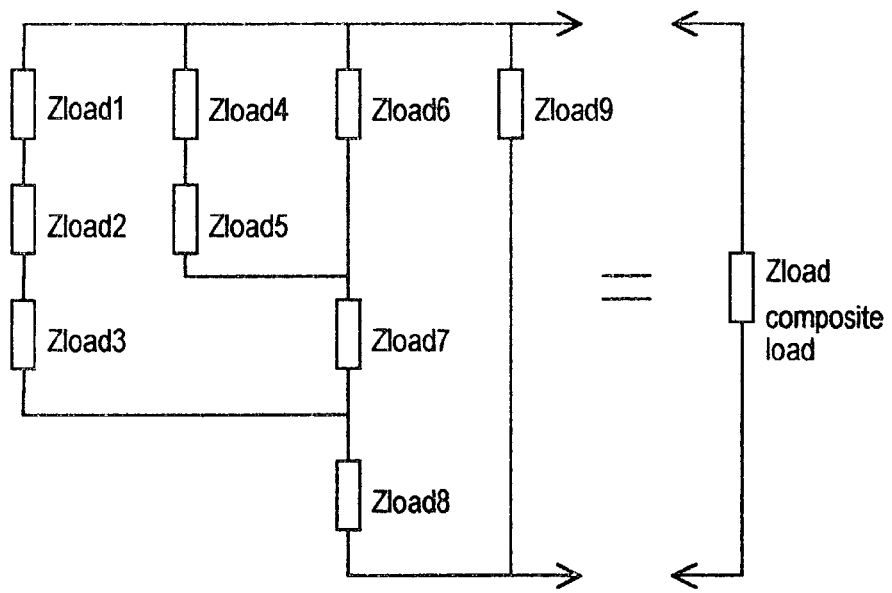
FIG. 15 is an example of a circuit diagram of a more complex network of individual loads, which can be symbolized, for simplicity, by a single composite load

FIG. 15 shows an example of a more complex load—a group of individual loads connected in series, in parallel, mixed. This is only an example, showing that a load can consist of multiple individual loads, arbitrarily connected. Because the particular way in which the loads are connected, may be irrelevant for certain considerations pertaining to the present invention, these loads can be represented, for simplicity, as a single composite load, its transfer characteristics being those of the network of the individual loads it contains.

Figure 16:
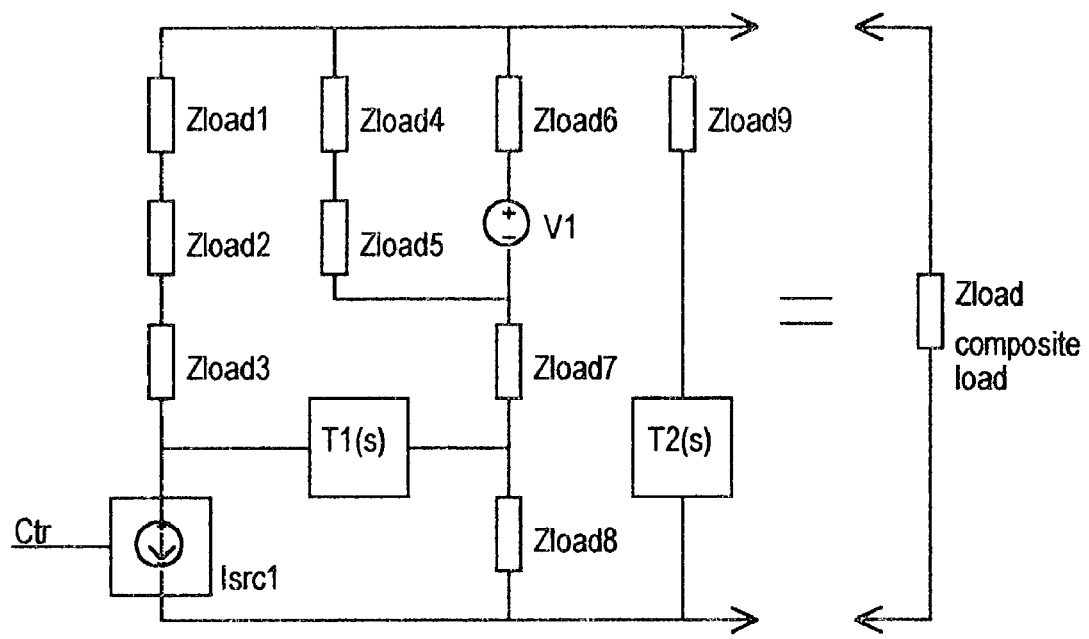
FIG. 16 is an example of a circuit diagram of a composite load that includes current and voltage sources, as well as functional blocks.

FIG. 16 shows an example of another increase in load complexity—when the composite load includes voltage and/or current sources, functional blocks, etc. Again, the detailed load structure, per se, may be irrelevant for certain considerations pertaining to the present invention, so, for simplicity, this type of loads can be represented as a single composite load with its transfer characteristics being those of the network it represents. For simplicity, the optional control terminals that may exist inside the load, are not represented in the composite load symbol. When they are important for a particular aspect of operation, they—and the load—can be represented as detailed as they have to be. The simplified representation is used here for clarity, when illustrating principles that can be stated regardless of the level of detail in the load representation. It is worth mentioning that current sources may control the current for particular sections of the composite load, while the current for the whole composite load is controlled by another current source. The multi-level current control can be arbitrarily distributed throughout the composite load. The considerations made previously, about the connection between the control signal(s) Ctr and the inductive DC converter DCC, also apply here.

Figure 17:
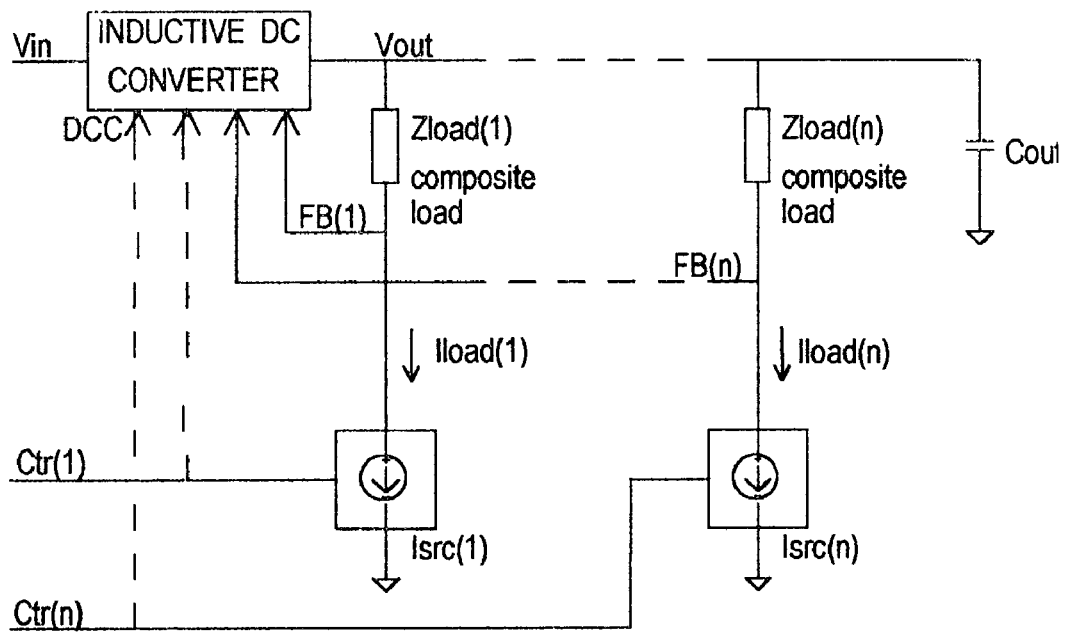
FIG. 17 is a diagram of a circuit in accordance with the present invention that employs an inductive DC converter for delivering a controlled output current into parallel composite loads, each of which is connected in series with a current source circuit.

FIG. 17 shows an embodiment of the present invention in which multiple parallel groups of loads are driven by the inductive DC converter DCC. The current in each branch is separately regulated by a current source. An arbitrary number of such groups of loads are covered under the method proposed in the present invention. Each load, designated as Zload(1) through Zload(n) in FIG. 17, is a composite load, consisting of an arbitrary number of loads, that can be connected in series, in parallel, or mixed. The composite load Zload(1) has the total current Iload(1) flowing through it. The current Iload(1) is controlled by the current source Isrc(1). The current source Isrc(1) has an optional control terminal, Ctr(1), allowing the modulation and/or control of its current. If the terminal Ctr1 allows to turn off the current generated by the current source Isrc1 during operation, then the control signal Ctr1 may be fed to the inductive DC converter DCC as well, in order to have it ignore the operating condition of the current source Isrc1, operating condition extracted from the FB(1) signal, when the current source Isrc(1) is disabled. This feature is represented by the dotted connection between the control signal Ctr(1) and the inductive DC converter DCC. The same considerations apply for each and every branch of the load, the last of which is designated in FIG. 17 by the composite load Zload(n), passed by the current Iload(n), which is controlled by the current source Isrc(n), featuring the optional control pin Ctr(n), whose optional connection to the inductive DC converter DCC, in case the control signal Ctr(n) allows turning off the current put out by the current source Isrc(n) during operation, is represented by a dotted line in FIG. 17, this feature allowing the inductive DC converter DCC to ignore the operating condition of the current source Isrc(n) when the latter is disabled, operating condition monitored by means of the feedback signal FB(n). In the particular case when all composite loads are identical and have to be identically powered at the same time, the number of FB signals and Ctr signals fed back to the inductive DC converter DCC can be reduced. According to the present invention, the goal is to have the inductive DC converter DCC provide enough output voltage to properly bias each of the load current sources Isrc(1) through Isrc(n). If the loads vary from each other, it is necessary to monitor the operating condition of each current source, in order to provide enough bias for the one with the most demanding needs. If each current source must generate the same current, at the same time, in identical loads, then a single feedback signal FB, picked up from any current source, is representative for all current sources and it is fed back to the inductive DC converter DCC, together with the common signal Ctr (the current source control signal Ctr is common if all the current sources must operate in same way, at the same time). It is worth mentioning that this arrangement will prevent detection of a fault in any load other than the one whose feedback signal FB is being monitored. If the loads are different, continuously powered (no current source control Ctr signals) and the location of the largest voltage drop required across a current source, is known, the feedback signal FB from that particular location can be used as representative for all current sources in the circuit and fed back to the inductive DC converter DCC. Again, this setting would not allow fault detection in an arbitrary composite load. If that location is not known, all load current sources (Isrc(1) through Isrc(n)) must be monitored (feedback signals FB(1) through FB(n)) and the inductive DC converter circuit DCC must output enough voltage for the most demanding of the loads. The arrangement shown in FIG. 17 allows independent control, modulation, etc., of the current in each composite load branch, case in which all of these control signals, Ctr(1) through Ctr(n), may be fed back to the inductive DC converter DCC, in order to ignore the operating condition of any current source which is disabled by its respective Ctr signal.

We claim:

1. A circuit for delivering a regulated output current into a load, the circuit comprising:
   an inductive DC converter having voltage feedback capability;
   current source means connected in series with the load, the series connected current source means and load being connected to an output of said inductive DC converter; and
   monitoring means for monitoring the voltage drop across said current source means and for feeding said voltage drop back to said inductive DC converter to thereby control load current and separate load current regulation from the voltage loop regulation of said inductive DC converter, said monitoring means representing no more than a negligible load on a feedback node of the circuit.

2. A circuit as in claim 1, wherein said current source means comprises means for selectively switching the current supplied thereby on and off and for selectively modulating the current supplied thereby.

3. A circuit as in claim 1, wherein said load is a composite load, comprising a plurality of individual loads selectively connected together.

4. A circuit as in claim 2, wherein said load is a composite load, comprising a plurality of individual loads selectively connected together.

5. A circuit as in claim 3, wherein said current source means comprises a plurality of individual current source means, each of which is connected to a group of one or more of said individual loads.

6. A circuit as in claim 4, wherein said current source means comprises a plurality of individual current source means, each of which is connected to a group of one or more of said individual loads.

* * * * *